US009063559B2

(12) United States Patent
Ivanov et al.

(10) Patent No.: US 9,063,559 B2
(45) Date of Patent: Jun. 23, 2015

(54) BATTERY CHARGER AND METHOD FOR COLLECTING MAXIMUM POWER FROM ENERGY HARVESTER CIRCUIT

(75) Inventors: Vadim V. Ivanov, Tucson, AZ (US); Christian Link, Plano, TX (US)

(73) Assignee: TEXAS INSTRUMENTS INCORPORATION, Dallas, TX (US)

(*) Notice: Subject to any disclaimer, the term of this patent is extended or adjusted under 35 U.S.C. 154(b) by 561 days.

(21) Appl. No.: 12/661,005

(22) Filed: Mar. 9, 2010

(65) Prior Publication Data
US 2011/0221416 A1  Sep. 15, 2011

(51) Int. Cl.
*G05F 1/67* (2006.01)
*H02J 7/35* (2006.01)

(52) U.S. Cl.
CPC ... *G05F 1/67* (2013.01); *H02J 7/35* (2013.01); *Y02E 10/58* (2013.01)

(58) Field of Classification Search
USPC ......... 323/205–211, 218, 220, 222, 223, 233, 323/299, 364, 906
See application file for complete search history.

(56) References Cited

U.S. PATENT DOCUMENTS

| | | | |
|---|---|---|---|
| 4,695,785 A * | 9/1987 | Mieth et al. | 323/222 |
| 5,604,430 A * | 2/1997 | Decker et al. | 323/275 |
| 6,377,034 B1 | 4/2002 | Ivanov | 323/287 |
| 7,394,237 B2 | 7/2008 | Chou et al. | 323/299 |
| 7,564,013 B2 | 7/2009 | Leonhardt et al. | 250/203.4 |
| 2004/0257842 A1 * | 12/2004 | Hui et al. | 363/97 |
| 2007/0290668 A1 * | 12/2007 | Chou et al. | 323/299 |
| 2008/0036440 A1 * | 2/2008 | Garmer | 323/299 |
| 2008/0246463 A1 * | 10/2008 | Sinton et al. | 324/157 |
| 2009/0206666 A1 | 8/2009 | Sella et al. | |
| 2010/0157632 A1 * | 6/2010 | Batten et al. | 363/74 |

FOREIGN PATENT DOCUMENTS

| | | |
|---|---|---|
| JP | 11103538 | 4/1999 |
| JP | 11041832 | 12/1999 |

OTHER PUBLICATIONS

"Adaptive Piezoelectric Energy Harvesting Circuit for Wireless Remote Power Supply" by Ottman et al., IEEE Transactions on Power Electronics, vol. 17, No. 5, Sep. 2002, pp. 669-676.

(Continued)

*Primary Examiner* — Jessica Han
*Assistant Examiner* — Gustavo Rosario Benitez
(74) *Attorney, Agent, or Firm* — William B. Kempler; Frank D. Cimino

(57) ABSTRACT

An energy harvesting system for transferring energy from an energy harvester (2) having an output impedance ($Z_i$) to a DC-DC converter (10) includes a maximum power point tracking (MPPT) circuit (12) including a replica impedance ($Z_R$) which is a multiple (N) of the output impedance. The MPPT circuit applies a voltage across the replica impedance that is equal to an output voltage ($V_{in}$) of the harvester to generate a feedback current ($I_{ZR}$) which is equal to an input current ($I_{in}$) received from the harvester, divided by the multiple (N), to provide maximum power point tracking between the harvester and the converter.

17 Claims, 4 Drawing Sheets

(56) References Cited

OTHER PUBLICATIONS

"Cascaded H-Bridge Multilevel Converter for Grid Connected Photovoltaic Generators with Independent Maximum Power Point Tracking of each Solar Array," IEEE Power Electronics Specialist Conference Proceedings, Jun. 15, 2003, vol. 2, pp. 731-735 (Lonos O., et al.).

Cascaded DC-DC Converter Connection of Photovoltaic Modules, IEEE Power Electronics Specialist Conference Proceedings, Jun. 23, 2002, vol. 1, pp. 24-29 (Walker, et al.).

PCT Search Report mailed Jun. 21, 2011.

* cited by examiner

BATTERY CHARGER AND METHOD FOR COLLECTING MAXIMUM POWER FROM ENERGY HARVESTER CIRCUIT

BACKGROUND OF THE INVENTION

The present invention relates generally to energy harvesting, and more particularly to circuits and methods for improving the efficiency of transferring energy from energy harvesting devices to energy storage devices and/or load devices.

Recently, various very low power integrated circuits that require extremely low amounts of operating current (often referred to as "nano-power" integrated circuits) have been developed which can be powered by very small amounts of power scavenged or harvested from ambient solar, vibrational, thermal, and/or biological energy sources by means of micro-energy harvesting devices. The harvested power then usually is stored in batteries or supercapacitors. (The term "nano-power" as used herein is intended to encompass circuits and/or circuit components which draw DC current of less than roughly 1 microampere.)

FIG. 1 shows an energy harvesting system 1-1 in which the output of a thermopile energy harvester 2-1 is coupled by a DC-DC converter (i.e., battery charger) 10 to a battery or supercapacitor 6, hereinafter referred to simply as battery 6. Thermopile energy harvester 2-1 can be modeled as a voltage source $V_T$ coupled between ground and one terminal 3A of a resistor $R_i$. Resistor $R_i$ represents the internal thermopile resistance. An internal capacitance $C_T$ is coupled between conductor 3A and ground. (The internal resistance of typical commercially available thermopile harvesters may be from about 300 ohms to 1 kilohm.) The output of thermopile energy harvester 2-1 applies an output voltage $V_{out}$ via conductor 3 to the input of DC-DC-converter 10, thereby supplying an output current $I_{out}$ into DC-DC converter 10, which charges battery 6.

It can be readily shown that the transfer of power from thermopile energy harvester 2-1 is optimized if the thermopile harvester output resistance is equal to the equivalent input resistance $V_{in}/I_{in}$ of DC-DC converter 10. The input impedance $V_{in}/I_{in}$ of a typical boost, buck, or buck/boost converter or battery charger 10 typically does not have a fixed value, because DC-DC converter 10 operates so as to draw as much input current from its input as battery 6 can accept.

FIG. 2 shows another energy harvesting system 1-2 in which the output of an induction harvester 2-2 is coupled by DC-DC converter 10 to battery 6. Induction harvester 2-2 can be modeled as an EMF (electromotive force) voltage source $\epsilon_L$ coupled in series with inductances $L_{FB}$ and $L_{coil}$ and coil resistance $R_{coil}$. (The internal resistance $R_{coil}$ of typical commercially available induction harvesters may be from about 1 ohm to 10 kilohms.) For optimum power transfer it is necessary to match the input impedance of DC-DC converter 10 to the output impedance of induction harvester 2-2.

FIG. 3 shows yet another energy harvesting system 1-3 in which the output of photo-voltaic solar cell 2-3 is coupled by a DC-DC converter 10 to battery 6. Solar cell harvester 2-3 can be modeled as a current source $I_{PH}$ coupled between conductor 3A and ground in parallel with diode D and leakage resistance $R_P$. A series resistance $R_S$ (which typically may be from about 0.1 to 100 ohms) is connected between conductor 3A and harvester output conductor 3. For optimum power transfer it is necessary to match the input impedance of the DC-DC converter to the equivalent output impedance of solar cell harvester 2-3.

The $I_{out}/P_{out}$ versus $V_{out}$ curve in FIG. 3 indicates that if $V_{out}$ is held above the turn-on threshold voltage of diode D, then all of the current $I_{out}$ generated by solar harvester 2-3 flows through diode D to ground. Therefore, if the value of $V_{out}$ is too high, the current generated by solar harvester 2-3 is wasted. Initially, $P_{out}$ increases linearly with respect to $V_{out}$ because the generated current $I_{out}$ by the current source $I_{PH}$ in FIG. 3 is constant. As the generated current starts to flow through diode D, a maximum or peak value occurs in the $P_{out}$ curve. Thus, if the value of $V_{out}$ is too low, the full amount of available harvested power ($V_{out} \times I_{out}$) is not being made available at the output of solar cell harvester 2-3, and if the value of $V_{out}$ is high enough that some or all of the generated current $I_{PH}$ is flowing through diode D to ground, then the corresponding power is wasted and cannot be converted into a suitable output voltage and output current for charging battery 6.

The amount of power available from the harvesters of FIGS. 1-3 usually is small and unpredictable, so the intermediate energy storage (e.g., lithium batteries or supercapacitors) is often required in these applications to provide for system power needs when energy from the harvester is unavailable or insufficient. It is important that the small amounts of power available from nano-power harvesting devices be "managed" so that the harvested energy is transferred as efficiently as possible, with minimum power loss, to charge batteries or energize utilization devices.

Well known impedance matching techniques to optimize transfer of power from the output of a first circuit to the input of a second circuit involve matching the output impedance of the first circuit to the input impedance of the second circuit.

A common technique for optimizing the efficiency of harvesting power from large P-V (photo-voltaic) solar cells (which generate large amounts of power) is managed in order to charge batteries and/or energize utilization devices is referred to as "maximum power point tracking" (MPPT). Such MPPT optimization utilizes a digital processor to control the amount of power being harvested by executing various known complex MPPT algorithms to adjust the voltage values and current values of the DC-DC converter 10 so as to derive a "maximum power point". Normally, MPPT tracking is performed by using a digital algorithm to adjust the input current $I_{in}$ delivered from the harvester to the input of the DC-DC converter and determining or measuring the amount of power delivered to the input of the DC-DC converter.

For example, the MPPT algorithm might decrease the amount of current $I_{in}$, which might cause the amount of power transferred to decrease. Or, the MPPT algorithm might repeatedly increase the amount of current $I_{in}$, which might cause the amount of power transferred to repeatedly increase, until at some point the amount of power transferred starts to decrease instead of increasing. This would mean that the point of a maximum efficiency power transfer, i.e., the maximum power point, under the present circumstances has been determined. The MPPT algorithm typically would operate so as to maintain the optimum efficiency balance between the input current $I_{in}$ delivered to the input of the DC-DC converter and the resulting input voltage $V_{in}$ of the DC-DC converter.

Unfortunately, such prior complex digital MPPT power optimization algorithms consume too much energy to be applicable in nano-power harvesting applications. Various patents, including U.S. Pat. No. 7,564,013 entitled "Method for Matching the Power of a Photovoltaic System to a Working Point at Which the System Produces Maximum Power" issued on Jul. 21, 2009 to Leonhardt et al. and U.S. Pat. No. 7,394,237 entitled "Maximum Power Point Tracking Method and Tracking Device Thereof for a Solar Power System" issued Jul. 1, 2008 to Chou et al., disclose known MPPT power optimization techniques.

Thus, there is an unmet need for a simple, economical technique to achieve maximum power point tracking of a nano-power energy harvester.

There also is an unmet need for an improved MPPT process which is suitable for use in nano-power energy harvesting applications.

There also is an unmet need for an improved circuit and method for avoiding power loss due to mismatch between the output impedance of an energy harvester and the input impedance of a DC-DC converter connected to the energy harvester.

There also is an unmet need for an improved MPPT (maximum power point tracking) process for use in nano-power energy harvesters which itself consumes much less power than prior MPPT processes.

There also is an unmet need for an improved circuit and method for avoiding power loss due to mismatching of energy harvester output impedance to the input impedance of a DC-DC converter over a range of operating conditions.

There also is an unmet need to provide a technique for cost-effective harvesting of energy under conditions wherein the energy required using conventional MPPT techniques exceeds the amount of available energy generated by the harvesting.

There also is an unmet need to provide a technique for controlling the effective input impedance of a DC-DC converter so as to allow it to receive a maximum amount of power from an energy harvester.

SUMMARY OF THE INVENTION

It is an object of the invention to provide a simple, economical technique to achieve maximum power point tracking of an energy harvester.

It is another object of the invention to provide an improved MPPT process which is suitable for use in nano-power energy harvesting applications.

It is another object of the invention to provide an improved circuit and method for avoiding power loss due to mismatch between the output impedance of an energy harvester and the input impedance of a DC-DC converter connected to the energy harvester.

It is another object of the invention to provide an improved MPPT (maximum power point tracking) process for use in nano-power energy harvesters which itself consumes much less power than prior MPPT processes.

It is another object of the invention to provide an improved circuit and method for avoiding power loss due to mismatching of energy harvester output impedance to the input impedance of the DC-DC converter over a range of operating conditions.

It is another object of the invention to provide a technique for cost-effective harvesting of energy under conditions wherein the energy required using conventional MPPT techniques exceeds the amount of available energy generated by the harvesting.

It is another object of the invention to provide a technique for controlling the effective input impedance of a DC-DC converter so as to allow it to receive maximum power from an energy harvester.

Briefly described, and in accordance with one embodiment, the present invention provides an energy harvesting system for transferring energy from an energy harvester (2) having an output impedance ($Z_i$) to a DC-DC converter (10). A maximum power point tracking (MPPT) circuit (12) includes a replica impedance ($Z_R$) which is a multiple (N) of the harvester output impedance. The MPPT circuit (12) applies a voltage equal to an output voltage ($V_{in}$) of the harvester across the replica impedance ($Z_R$) to generate a feedback current ($I_{ZR}$) which is equal to an input current ($I_{in}$) received from the harvester (2), divided by the multiple (N), to provide maximum power point tracking between the harvester (2) and the DC-DC converter (10).

In one embodiment, the invention provides an energy harvesting system (1-4,5, 6) including an energy harvester (2) having an output impedance ($Z_i$) and a first DC-DC converter (15) for converting an input voltage ($V_{in}$) received from an output conductor (3) of the energy harvester (2) to an output signal ($I_{BAT}$, $V_{BAT}$). The first DC-DC converter (15) has an input impedance ($V_{in} \div I_{in}$) controlled by the input voltage ($V_{in}$) to match the output impedance ($Z_i$) so as to provide maximum power point tracking (MPPT) between the energy harvester (2) and the first DC-DC converter (15). A receiving device (6) is coupled to receive the output signal ($I_{BAT}$, $V_{BAT}$). In a described embodiment, the first DC-DC converter (15) includes a second DC-DC converter (10) having a first input coupled to the output conductor (3) of the energy harvester (2) and a second input coupled to a reference voltage (GND). The first DC-DC converter (15) also includes a MPPT (maximum power point tracking) circuit (12) coupled between the output conductor (3) of the energy harvester (2) and the reference voltage (GND).

In a described embodiment; the MPPT circuit (12) includes a replica impedance ($Z_R$) coupled between the output conductor (3) of the energy harvester (2) and the reference voltage (GND). The replica impedance ($Z_R$) has a value which is a predetermined multiple (N) of the harvester output impedance ($Z_i$), wherein a feedback or replica current ($I_{ZR}$) flows through the replica impedance ($Z_R$). The replica current ($I_{ZR}$) is equal to the input current ($I_{in}$) divided by the predetermined multiple (N). In a described embodiment, the predetermined multiple (N) is approximately 4000.

In one embodiment, the MPPT circuit (12) includes a transistor (M0) coupled between a conductor (28) and the replica impedance ($Z_R$). The replica current ($I_{ZR}$) flows through the conductor (28). The MPPT circuit (12) also includes an amplifier (24) having a first input (−) coupled to the output conductor (3) of the energy harvester (2), an output coupled to a control electrode of the transistor (M0), and a second input (+) coupled to a junction (9) between the transistor (M0) and the replica impedance ($Z_R$).

In a described embodiment, the second DC-DC converter (10) includes an inductor (L0) having a first terminal (3-1) coupled to the output conductor (3) of the energy harvester (2) and a second terminal (4) coupled to a first terminal of a switch (S0) and to an anode terminal of a rectifier (D0). A second terminal of the switch (S0) is coupled to the reference voltage (GND).

In one embodiment, the second DC-DC converter (10) includes a PWM (pulse width modulator) circuit (20) having an output coupled to a control terminal of the switch (S0) and an input (27) coupled to the conductor (28), and the MPPT circuit (12) includes a current sensor (13) having a first current-conducting terminal connected to the output terminal (3) of the energy harvester (2), a second current-conducting terminal connected to the first terminal (3-1) of the inductor (L0), and an output coupled by means of a current summing circuit (23) to the conductor (28). The replica current ($I_{ZR}$) is compared to an inductor current sensed by the current sensor (13) and wherein the PWM circuit (20) accordingly controls the duty cycle of the switch (S0) so as to maintain the replica current ($I_{ZR}$) equal to the input current ($I_{in}$) divided by the predetermined multiple (N). The amplifier (24) operates to maintain a voltage across the replica impedance ($Z_R$) equal to the a voltage ($V_{in}$) on the output conductor (3) of the energy harvester (2).

In one embodiment, a processor (30) is coupled to the replica impedance ($Z_R$) to provide predetermined adjustments to the value of the replica impedance ($Z_R$) at predetermined times, respectively.

In one embodiment, the invention provides a method for optimizing the efficiency of transferring energy to a second DC-DC converter (10), including applying an output current ($I_{out}$) generated by an energy harvester (2) having an output impedance ($Z_1$) as an input current ($I_{in}$) to a second DC-DC converter (10); providing a replica impedance ($Z_R$) which is a scaled replica of the output impedance ($Z_1$) equal to the output impedance ($Z_i$) multiplied by a predetermined multiple (N); applying an output voltage ($V_{in}$) received from an output conductor (3) of the energy harvester (2) across the replica impedance ($Z_R$) to generate a feedback current ($I_{ZR}$) representative of the input current ($I_{in}$) supplied by the energy harvester (2) to the second DC-DC converter, the feedback current ($I_{ZR}$) flowing to the replica impedance ($Z_R$) being derived from the input current ($I_{in}$) to provide maximum power point tracking (MPPT) between the energy harvester (2) and the second DC-DC converter (10); and applying an output signal ($V_{BAT}$) generated by the second DC-DC converter (10) to a receiving device (6).

In one embodiment, the method includes applying the output voltage ($V_{in}$) received from the output conductor (3) of the energy harvester (2) across the replica impedance ($Z_R$) by means of an operational amplifier (24) having a first input (−) coupled to the output conductor (3) of the energy harvester (2), an output coupled to a control electrode of a transistor (M0) coupled between the output conductor (3) of the energy harvester (2), and a second input (+) coupled to a junction (9) between the transistor (M0) and the replica impedance ($Z_R$). In one embodiment, the second DC-DC converter (10) includes an inductor (L0) having a first terminal (3-1) coupled to the output conductor (3) of the energy harvester (2) and a second terminal (4) coupled to a first terminal of a switch (S0) and to an anode terminal of a rectifier (D0), a second terminal of the switch (S0) being coupled to the reference voltage (GND), the method including coupling an input of a PWM circuit (20) to the conductor (28) and coupling an output coupled off the PWM circuit (20) to a control terminal of the switch (S0).

In one embodiment, the method includes comparing the feedback current ($I_{ZR}$) is compared to a current in the inductor (L0) and operating the PWM circuit (20) to control the duty cycle of the switch (S0) so as to maintain the feedback current ($I_{ZR}$) equal to the input current ($I_{in}$) divided by the predetermined multiple (N).

In one embodiment, the method includes providing the replica resistance ($Z_R$) with a value that is approximately 4000 times greater than the value of the output impedance ($Z_i$).

In one embodiment, the invention provides an energy harvesting system for optimizing the efficiency of transferring energy to a DC-DC converter (10), including means (3, 13) for applying an output current ($I_{out}$) generated by an energy harvester (2) having an output impedance ($Z_i$) as an input current ($I_{in}$) to the DC-DC converter (10); replica impedance means ($Z_R$) for providing a replica impedance ($Z_R$) which is a scaled representation of the output impedance ($Z_1$); means (24, M0) for applying an output voltage ($V_{in}$) received from an output conductor (3) of the energy harvester (2) across the replica impedance ($Z_R$) to generate a feedback current ($I_{ZR}$) representative of the input current ($I_{ZR}$) supplied by the energy harvester (2) to the DC-DC converter, the replica feedback current ($I_{ZR}$) flowing to the impedance ($Z_R$) being derived from the output conductor (3) of the energy harvester (2) to provide maximum power point tracking (MPPT) between the energy harvester (2) and the DC-DC converter (10); and means (5) for applying an output signal ($V_{BAT}$) generated by the DC-DC converter (10) to a receiving device (6).

DETAILED DESCRIPTION OF THE PREFERRED EMBODIMENTS

Figure 4:
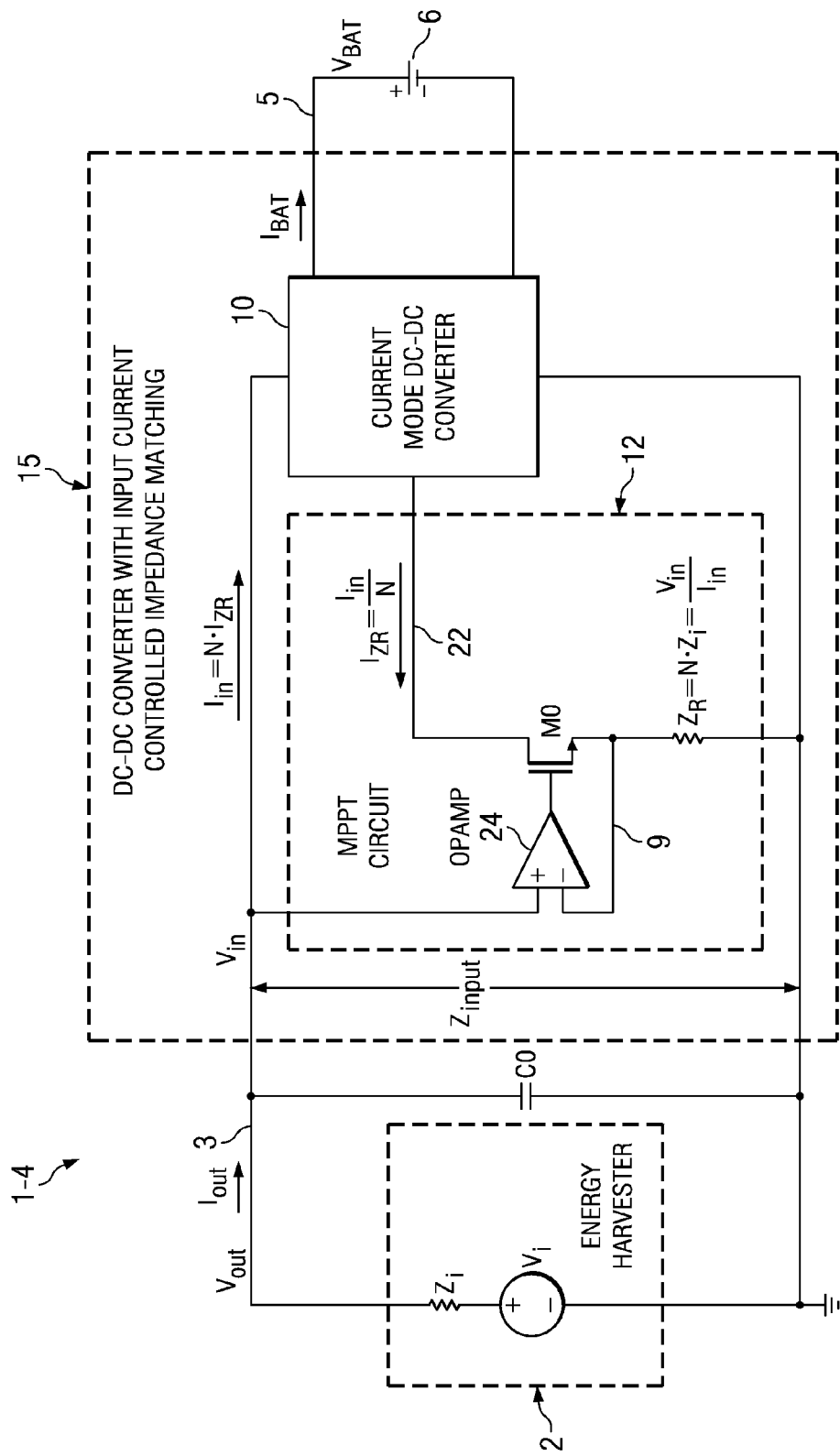
FIG. 4 is a block diagram of an energy harvester coupled to a maximum power point tracking circuit associated with a DC-DC converter coupled between the energy and a battery.

FIG. 4 shows an energy harvesting system 1-4 in which the output of energy harvester 2 is coupled by a DC-DC converter or battery charger 15 to battery 6. DC-DC converter 15 delivers a current $I_{BAT}$ and corresponding voltage $V_{BAT}$ to battery 6 via conductor 52. Energy harvester 2 is modeled as a voltage source $V_i$ coupled between ground and one terminal of an internal impedance $Z_i$ of energy harvester 2. The other terminal of internal impedance $Z_i$ is connected by conductor 3 to the output of harvester 2, on which a harvester output voltage $V_{out}$ is generated. A harvester output current $I_{out}$ flows through conductor 3. The output 3 of energy harvester 2 is connected to the input of DC-DC converter 15 and applies an output voltage $V_{in}$ via conductor 3 to the input of DC-DC converter 15 and also supplies an input current $I_{in}$ to DC-DC converter 15. Thus, the output voltage $V_{out}$ and output current $I_{out}$ generated by harvester 2 are equal to the input voltage $V_{in}$ and input current $I_{in}$, respectively, of DC-DC converter 15. DC-DC converter 15 charges battery 6 via output conductor 5.

DC-DC converter 15 in FIG. 4 is a DC-DC converter having a controlled-input impedance Zinput equal to $V_{in} \div I_{in}$. DC-DC converter 15 includes a conventional DC-DC converter 10 and a MPPT (maximum power point tracking) circuit 12. Two inputs of DC-DC converter 10 are connected to conductor 3 and ground, respectively. DC-DC converter 10 provides a "replica" feedback current $I_{ZR}$ which controls the input current $I_{in}$ (e.g., the inductor current in inductor L0 of FIG. 5) in DC-DC converter 10 so as to make $I_{in}$ proportional to feedback current $I_{ZR}$.

MPPT circuit 12 of DC-DC converter 15 includes an operational amplifier 24 having its (−) input connected to conductor 3 and its output connected to the gate of a N-channel transistor M0. The drain of transistor M0 is connected by conductor 22 to a feedback terminal of DC-DC converter 10 and conducts feedback current $I_{ZR}$ into the drain of transistor M0. The source of transistor M0 is connected by conductor 9 to one terminal of a "replica" impedance $Z_R$ and to the (+) input of amplifier 24. The other terminal of replica impedance $Z_R$ is connected to ground. Replica impedance $Z_R$ is a scaled (by a factor of N) replica of output impedance $Z_i$ of energy harvester 2.

A feedback loop including conductor 22, transistor M0, amplifier 24, and replica impedance $Z_R$ operates to keep the voltage across replica impedance $Z_R$ equal to input voltage $V_{in}$. $V_{in}$ varies according to how much power or input current is presently being generated by harvester 2. The value of feedback current $I_{ZR}$ is determined by the value of replica impedance $Z_R = N \times Z_i = V_{in} \div I_{in}$. The operation of DC-DC converter 15 is such that replica impedance $Z_R$ is equal to $V_{in} \div I_{in}$, which is the effective input impedance of DC-DC converter 15. Therefore, replica current $I_{ZR}$, which flows to ground through the feedback impedance $Z_R = N \times Z_i = V_{in} \div I_{in}$, is equal to $I_{in}/N$. The multiple N may have a relatively high value, e.g., 4000. DC-DC converter 15 appears to energy harvester 2 as replica impedance $Z_R = N \times Z_i = V_{in} \div I_{in}$ and therefore is considered to be matched to the harvester output impedance $Z_i$. (Since the current $I_{in}$ flows through output impedance $Z_i$ of energy harvester 2, and since replica current $I_{ZR} = I_{in}/N$ flows through replica impedance $Z_R = N \times Z_i$, the resulting voltage drop across harvester output impedance $Z_i$ is equal to the resulting voltage drop across replica impedance $Z_R = N \times Z_i$, so harvester output impedance $Z_i$ is matched to the input impedance $Z_R = N \times Z_i = V_{in} \div I_{in}$.)

Feedback current $I_{ZR}$ tracks changes in input voltage $V_{in}$, and this is what keeps replica impedance $Z_R$ and input impedance $V_{in}/I_{in}$ approximately matched to harvester output impedance $Z_i$. As an example, if replica impedance $Z_R$ is equal to 1 megohm and the multiple or scale factor N is equal to 4000, then DC-DC converter 15 will appear to harvester 2 as a 250 ohm resistor.

Thus, energy harvester system 1-4 in FIG. 4 provides a way to control the effective input impedance of DC-DC converter 15 by causing the effective input impedance $V_{in} \div I_{in}$ to match the output impedance of energy harvester 2. This is accomplished by using input voltage $V_{in}$ of the DC-DC converter 15 to generate feedback current $I_{ZR}$, for example by means of replica impedance $Z_R$. Replica impedance $Z_R$ can be provided by means of a suitable resistor or diode or other component which roughly matches the output impedance of a particular energy harvester 2. DC-DC converter 10 is configured in such a way that it provides feedback current $I_{ZR}$ so as to determine the input current $I_{in}$ of DC-DC converter 15 such that effective input impedance $Z_R = N \times Z_i = V_{in} \div I_{in}$ appears to the output of harvester 2 as the matched replica impedance $Z_R$.

Figure 1:
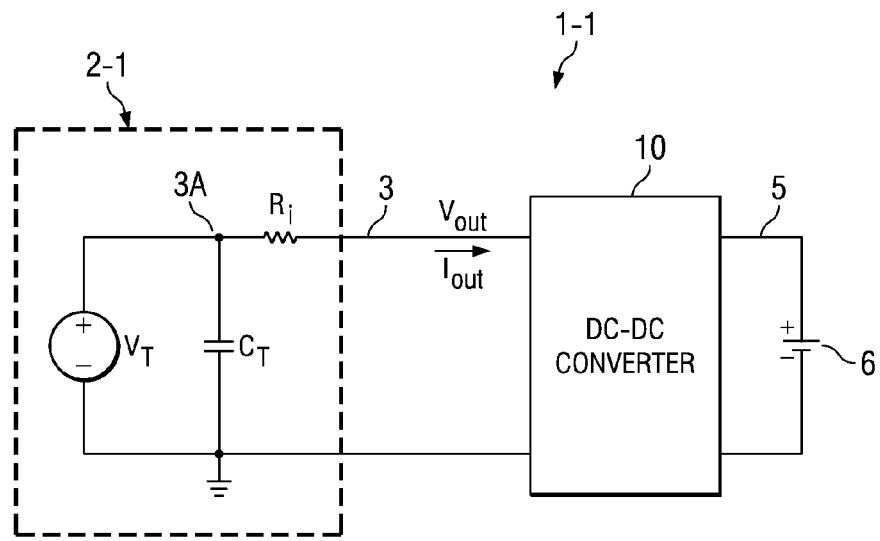
FIG. 1 is a schematic diagram of an equivalent circuit of a thermopile energy harvester coupled to a battery by means a power management circuit.
Figure 2:
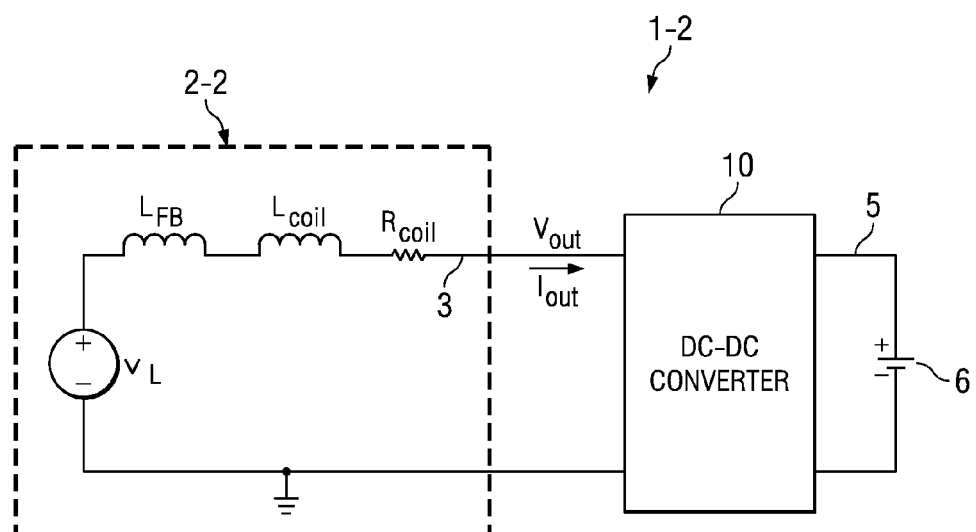
FIG. 2 is a schematic diagram of an induction harvester equivalent circuit coupled to a battery by means of a power management circuit.
Figure 3:
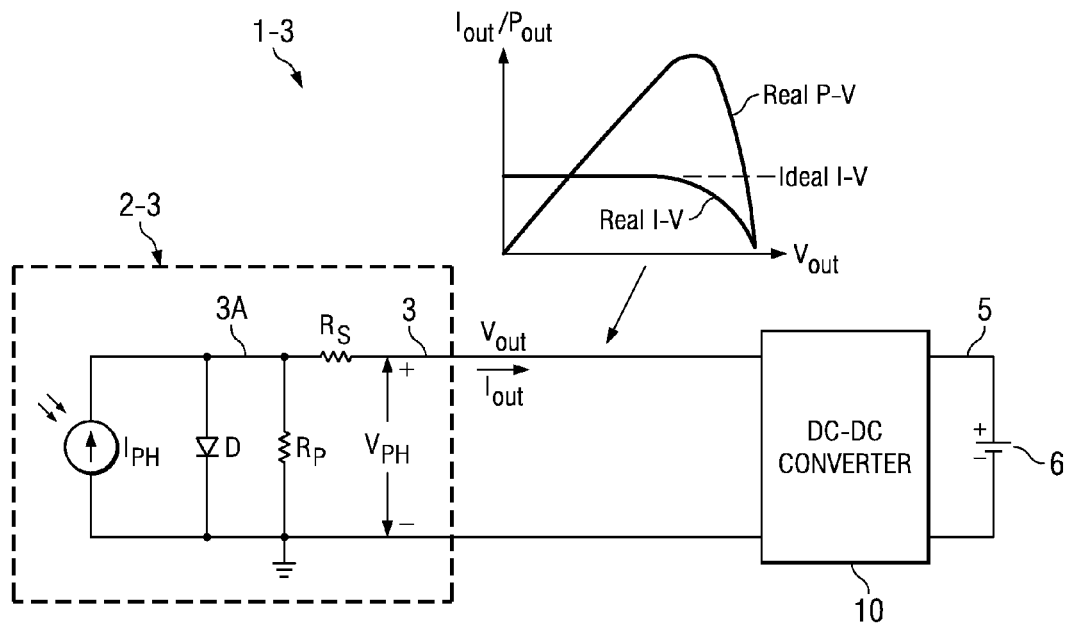
FIG. 3 is a schematic diagram of a solar cell harvester equivalent circuit coupled to a battery by means of a power management circuit.
Figure 5:
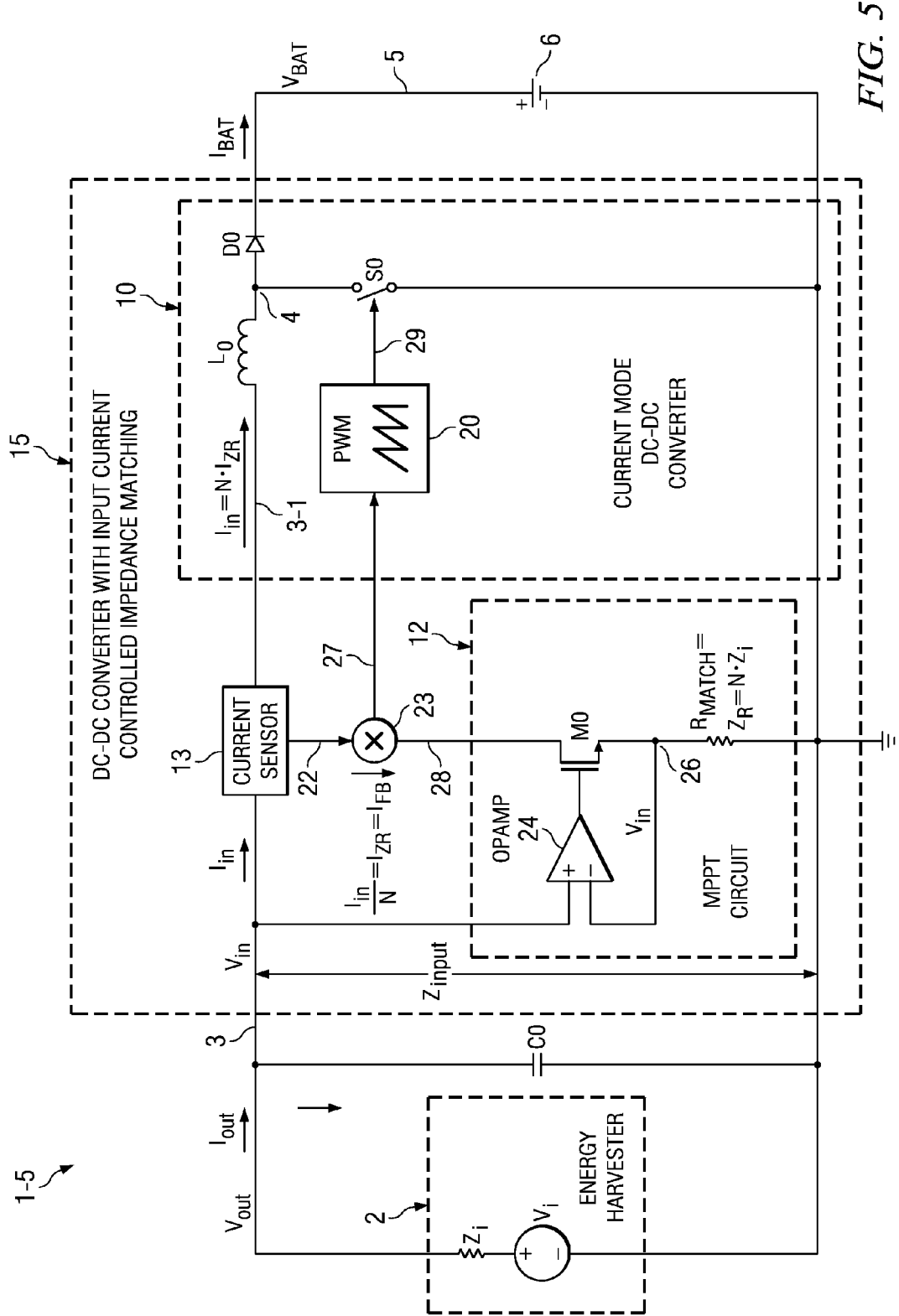
FIG. 5 is a schematic diagram of a more detailed implementation of the circuit shown in FIG. 4.

Energy harvesting system 1-5 of FIG. 5 includes a more detailed implementation of DC-DC converter 15. DC-DC converter 10 in FIG. 5 includes inductor L0 with one terminal connected to one current-conducting terminal 3-1 of a current sensor circuit 13. (One way current sensor circuit 13 can be implemented is indicated in FIG. 1 of commonly assigned U.S. Pat. No. 6,377,034 entitled "Method and Circuits for Inductor Current Measurement in MOS Switching Regulators" issued to Ivanov on Apr. 23, 2002, which is incorporated herein by reference.) The other terminal of inductor L0 is connected by conductor 4 to one terminal of switch S0 and to the "anode" terminal of a synchronous rectifier circuit or diode D0. The cathode of diode D0 is connected by conductor 5 to the (+) terminal of battery 6. DC-DC converter 15 delivers a current $I_{BAT}$ and corresponding voltage $V_{BAT}$ to battery 6 via conductor 52.

The other terminal of switch S0 is connected to ground. The control terminal of switch S0 is connected to the output 29 of a conventional pulse width modulator (PWM) circuit 20. The input of PWM circuit 20 is connected by conductor 27 to an output of a conventional current summing circuit 23. An input of current summing circuit 23 is connected by conductor 22 to the output of current sensor circuit 13. Another output of current summing circuit 23 is connected by conductor 28 to the drain of transistor M0. The other current-conducting terminal of current sensor 13 is connected to conductor 3.

Operational amplifier 24 maintains the voltage across replica resistor or impedance $Z_R$ equal to $V_{in}$ (as in FIG. 4). The output of current sensor circuit 13 is the feedback current $I_{ZR}$ which flows through transistor M0 and replica impedance $Z_R$. The feedback current $I_{ZR}$ controls the input current $I_{in}$ of DC-DC converter 15. As in FIG. 4, the equivalent input impedance $V_{in} \div I_{in}$ of DC-DC converter 15 in FIG. 5 is equal to $Z_R$ multiplied by the current sensor ratio N, which is equal to $I_{in}/I_{ZR}$. The feedback current $I_{ZR}$ is compared to the sensed inductor current $I_{in}$. This comparison of $I_{ZR}$ to the sensed inductor current $I_{in}$ is accomplished by causing $I_{in}$ and $I_{ZR}$ to flow in opposed directions into a connection point that is loaded by an impedance, such as a filtering capacitance or a resistance. The difference between the two currents develops a corresponding difference voltage across the impedance, and that difference voltage is applied to the input of PWM circuit 20. PWM circuit 20 accordingly controls the duty cycle of switch S0 so as to maintain $I_{ZR}$ equal to $I_{in}/N$. (PWM circuit 20 typically can include an oscillator and a few other circuit elements, but it can be just a hysteretic comparator in a self-oscillating loop.) In any case, the resulting limiting of the feedback current $I_{FB} = I_{ZR}$ effectively limits the current $I_{in}$ through inductor L0.

It should be appreciated that the above described MPPT circuit 12 is useful for micropower applications such as portable energy harvesters. However, MPPT circuit 12 has a fixed replica impedance $Z_R = N \times Z_i$, but using a fixed value of replica impedance $Z_R$ may not be suitable for certain energy harvesters in which the internal harvester impedance (i.e., the harvester output impedance) $Z_i$ can vary significantly over temperature, time and/or operating conditions. For example, in certain applications, such as large-scale solar power harvesting systems or automotive thermal harvester devices attached to a high-temperature engine or exhaust pipe, wherein relatively large amounts of harvested power are generated, the above described MPPT technique can be further optimized by making the replica impedance $Z_R$ occasionally or periodically adjustable.

Figure 6:
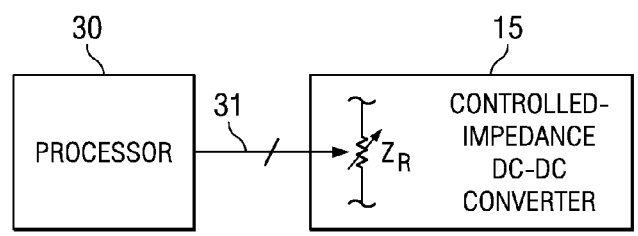
FIG. 6 is a block diagram illustrating use of a processor to periodically adjust the replica impedance $Z_R$ in FIGS. 4 and 5.

As shown in FIG. 6, this can be accomplished by utilizing a system processor 30 to adjust the value of $Z_R$ based on the amount of power being generated, in accordance with various known MPPT algorithms. Such $Z_R$ adjustments can be performed relatively infrequently, triggered, for example, by timekeeping devices or significant environmental changes. This technique can save computational system resources and can substantially reduce the amount of power consumed by the MPPT process.

The described MPPT system controls the converter input current $I_{in}$ in inductor L0 as a function of the input voltage $V_{in}$ applied by harvester 2 to the input of DC-DC converter 15 and provides effective matching of the harvester output impedance $Z_i$, to the input impedance $V_{in}/I_{in}$ of DC-DC converter 15, by providing a replica of the harvester output impedance $Z_i$ and biasing it with the output voltage of harvester 2 to determine the input impedance $V_{in} \div I_{in}$ of converter 15. This effectively optimizes transfer of power from harvester 2 to DC-DC converter 15 and produces a simple, economical MPPT circuit and technique for nano-power energy harvesting applications.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. An energy harvesting system comprising:
   (a) an energy harvester having an output impedance;
   (b) a first DC-DC converter for converting an input voltage received from an output conductor of the energy harvester to an output signal, the first DC-DC converter having an effective input impedance equal to Vin÷Iin controlled by the input voltage to match the output impedance of the energy harvester so as to provide maximum power point tracking (MPPT) between the energy harvester and the first DC-DC converter, wherein the MPPT circuit includes a replica impedance coupled between the output conductor of the energy harvester and a reference voltage, the replica impedance having a value which is a predetermined multiple of the harvester output impedance determined by: Zr=N×Zi=Vin÷Iin, where Zr is the replica impedance, N is the predetermined multiple which is a positive number greater than 1, Zi is the output impedance of the energy harvester, Vin is the output voltage of the energy harvester and Iin is the output current of the energy harvester, Vin÷Iin is the effective input impedance of the DC-DC converter, wherein a feedback current of Iin÷N flows through the replica impedance, and the MPPT circuit includes a transistor coupled between a conductor and the replica impedance, the feedback current flows through the conductor, and wherein the MPPT circuit also includes an amplifier having a first input coupled to the output conductor of the energy harvester, an output coupled to a control electrode of the transistor, and a second input coupled to a junction between the transistor and the replica impedance; and
   (c) an output couplable to a receiving device to receive the output signal.

2. The energy harvesting system of claim 1 wherein the receiving device includes a battery.

3. The energy harvesting system of claim 2 wherein the first DC-DC converter includes a second DC-DC converter having a first input coupled to the output conductor of the energy harvester and a second input coupled to the reference voltage, and wherein the first DC-DC converter also includes the that MPPT (maximum power point tracking) circuit coupled between the output conductor of the energy harvester and the reference voltage.

4. The energy harvesting system of claim 1 wherein the feedback current is equal to the input current divided by the predetermined multiple.

5. The energy harvesting system of claim 4 wherein the predetermined multiple is approximately 4000.

6. The energy harvesting system of claim 1 wherein the second DC-DC converter includes an inductor having a first terminal coupled to the output conductor of the energy harvester and a second terminal coupled to a first terminal of a switch and to an anode terminal of a rectifier, a second terminal of the switch being coupled to the reference voltage.

7. The energy harvesting system of claim 6 wherein the second DC-DC converter includes a PWM (pulse width modulator) circuit having an output coupled to a control terminal of the switch and an input coupled to the conductor.

8. The energy harvesting system of claim 7 wherein the MPPT circuit includes a current sensor having a first current-conducting terminal connected to the output terminal of the energy harvester, a second current-conducting terminal connected to the first terminal of the inductor, and an output coupled to the conductor.

9. The energy harvesting system of claim 8 wherein the feedback current is compared to an inductor current sensed by the current sensor and wherein the PWM circuit accordingly controls the duty cycle of the switch so as to maintain the feedback current equal to the input current divided by the predetermined multiple.

10. The energy harvesting system of claim 1 wherein the amplifier operates to maintain a voltage across the replica impedance equal to the voltage on the output conductor of the energy harvester.

11. The energy harvesting system of claim 1 including a processor coupled to the replica impedance to provide predetermined adjustments to the value of the replica impedance at predetermined times, respectively.

12. The energy harvesting system of claim 1 wherein the energy harvester is an energy harvester selected from the group including a vibration energy harvester, a photovoltaic solar cell energy harvester, and a thermal energy harvester.

13. A method for optimizing the efficiency of transferring energy to a DC-DC converter, the method comprising:
   (a) applying an output current generated by an energy harvester having an output impedance Zi as an input current Iin to the DC-DC converter;
   (b) providing a replica impedance Zr which is a scaled replica of the output impedance equal to the output impedance Zi multiplied by a predetermined multiple, where Zr is determined by:
   Zr=N×Zi=Vin÷Iin, where N is the predetermined multiple which is a positive number greater than 1, Vin is the output voltage of the energy harvester and Vin÷Iin is the effective input impedance of the DC-DC converter;
   (c) applying the output voltage received from an output conductor of the energy harvester across the replica impedance to generate a feedback current Iin÷N representative of the input current supplied by the energy harvester to the DC-DC converter, the feedback current flowing to the replica impedance being derived from the input current to provide maximum power point tracking (MPPT) between the energy harvester and the DC-DC converter, wherein applying the output voltage received from the output conductor of the energy harvester across the replica impedance includes by means of an operational amplifier having a first input coupled to the output conductor of the energy harvester, an output coupled to a control electrode of a transistor coupled between the output conductor of the energy harvester, and a second input of the operational amplifier coupled to a junction between the transistor and the replica impedance; and
   (d) applying an output signal generated by the DC-DC converter to a output of the DC-DC converter couplable to a receiving device.

14. The method of claim 13 wherein step (b) includes providing the replica resistance with a value that is approximately 4000 times greater than the value of the output impedance.

15. The method of claim 13 wherein the DC-DC converter includes an inductor having a first terminal coupled to the output conductor of the energy harvester and a second terminal coupled to a first terminal of a switch and to an anode terminal of a rectifier, a second terminal of the switch being coupled to the reference voltage, the method including coupling the conductor to an input of a pulse width modulated (PWM) circuit and coupling an output of the PWM circuit to a control terminal of the switch.

16. The method of claim 15 including comparing the feedback current is compared to a current in the inductor and operating the PWM circuit to control the duty cycle of the switch so as to maintain the feedback current equal to the input current divided by the predetermined multiple.

17. An energy harvesting system for optimizing the efficiency of transferring energy to a DC-DC converter, comprising:
(a) means for applying an output current Iin generated by an energy harvester having an output impedance Zi as an input current to the DC-DC converter;
(b) means for providing a replica impedance which is a scaled representation of the output impedance, where Zr is determined by:
Zr=N×Zi=Vin÷Iin, where N is the predetermined multiple which is a positive number greater than 1, Vin is the output voltage of the energy harvester and Vin÷Iin is the effective input impedance of the DC-DC converter;
(c) means for applying an output voltage received from an output conductor of the energy harvester across the replica impedance to generate a feedback current Iin÷N representative of the input current supplied by the energy harvester to the DC-DC converter, the feedback current flowing to the replica impedance being derived from the input current to provide maximum power point tracking (MPPT) between the energy harvester and the DC-DC converter, and means comprising an operational amplifier having a first input coupled to the output conductor of the energy harvester, an output coupled to a control electrode of a transistor coupled between the output conductor of the energy harvester, and a second input of the operational amplifier coupled to a junction between the transistor and the replica impedance; and
(d) means for applying an output signal generated by the DC-DC converter to an output of the DC-DC converter couplable to a receiving device.

* * * * *